(12) United States Patent
Chen et al.

(10) Patent No.: US 10,893,123 B2
(45) Date of Patent: Jan. 12, 2021

(54) APPARATUS AND METHOD FOR FLEXIBLE ACCESS CONTROL AND RESOURCE CONTROL IN A DECENTRALIZED SYSTEM

(71) Applicant: MOAC BLOCKCHAIN TECH INC, Palo Alto, CA (US)

(72) Inventors: Xiaohu Chen, Mountain View, CA (US); Xinle Yang, Portland, OR (US); Zhengpeng Li, Columbia, MD (US); Qing Xu, Palo Alto, CA (US); Yuechao Ma, Seattle, WA (US); Xiannong Fu, Irvine, CA (US); Yang Chen, Bellevue, WA (US)

(73) Assignee: MOAC BLOCK CHAIN TECH INC., Palo Alto, CA (US)

(*) Notice: Subject to any disclaimer, the term of this patent is extended or adjusted under 35 U.S.C. 154(b) by 195 days.

(21) Appl. No.: 16/121,766

(22) Filed: Sep. 5, 2018

(65) Prior Publication Data

US 2020/0076918 A1 Mar. 5, 2020

(51) Int. Cl.
*H04L 29/08* (2006.01)
*H04L 29/06* (2006.01)

(52) U.S. Cl.
CPC ........... *H04L 67/32* (2013.01); *H04L 63/102* (2013.01); *H04L 63/126* (2013.01); *H04L 67/1055* (2013.01); *H04L 67/1074* (2013.01); *H04L 67/2814* (2013.01)

(58) Field of Classification Search
CPC . H04L 2209/38; H04L 63/102; H04L 63/126; H04L 67/10
See application file for complete search history.

(56) References Cited

U.S. PATENT DOCUMENTS

| | | | | |
|---|---|---|---|---|
| 10,102,265 B1* | 10/2018 | Madisetti | ............... | G06Q 20/06 |
| 10,250,708 B1* | 4/2019 | Carver | ............... | H04L 67/1042 |
| 10,296,258 B1* | 5/2019 | Richardson | ......... | G06F 11/1076 |
| 10,630,769 B2* | 4/2020 | Carver | .................. | H04L 45/64 |
| 2018/0139278 A1* | 5/2018 | Bathen | ................. | H04L 9/3236 |
| 2018/0267539 A1* | 9/2018 | Shih | ........................ | G06Q 20/00 |
| 2018/0300382 A1* | 10/2018 | Madisetti | ........... | G06Q 20/0658 |
| 2018/0331835 A1* | 11/2018 | Jackson | ............... | H04L 9/3247 |
| 2018/0336552 A1* | 11/2018 | Bohli | .................. | H04L 67/1097 |
| 2018/0373776 A1* | 12/2018 | Madisetti | ............. | H04L 9/3263 |
| 2019/0018888 A1* | 1/2019 | Madisetti | ............. | H04L 9/3297 |
| 2019/0058581 A1* | 2/2019 | Wood | ................... | H04L 9/0637 |

(Continued)

*Primary Examiner* — Ranodhi Serrao

(57) ABSTRACT

A mechanism for managing a decentralized application functioning within an application shard in a decentralized network includes an access control mechanism and a resource control mechanism. The access control mechanism includes access logic that determines if a request to submit a transaction for execution by the decentralized application is valid. The request is received from an originator through the decentralized application. The resource control mechanism is called when a request is determined by the access control mechanism to be a valid request. The resource control mechanism includes resource logic that determines if a criterion is satisfied. The criterion may include one or more of a first criterion associated with the originator and a second criterion associated with the application shard. The resource control mechanism further includes forwarding logic that initiates a forwarding of the validated request to the application shard if the criterion is satisfied.

15 Claims, 7 Drawing Sheets

(56) References Cited

U.S. PATENT DOCUMENTS

| | | | |
|---|---|---|---|
| 2019/0197532 A1* | 6/2019 | Jayachandran | H04L 9/0618 |
| 2019/0199515 A1* | 6/2019 | Carver | H04L 9/0643 |
| 2019/0199516 A1* | 6/2019 | Carver | H04L 9/3297 |
| 2019/0199787 A1* | 6/2019 | Carver | H04L 67/108 |
| 2019/0349426 A1* | 11/2019 | Smith | H04L 67/104 |
| 2019/0349733 A1* | 11/2019 | Nolan | H04L 41/0806 |

* cited by examiner

APPARATUS AND METHOD FOR FLEXIBLE ACCESS CONTROL AND RESOURCE CONTROL IN A DECENTRALIZED SYSTEM

TECHNICAL FIELD

The present disclosure relates generally to transactions executed over large-scale networks, and more particularly, to apparatuses and methods that provide for controlled access to a decentralized system and controlled use of the resources within the system, without the requirement of a transaction fee.

BACKGROUND

In a decentralized blockchain system, transactions are the most basic operations. A transaction is a record of an event, for example, the event of transferring cash from a sender's account to a beneficiary's account. A block is made up of transactions, and its size varies depending on the type and design of the blockchain. Most of the blockchain transactions require payment of a transaction fee, usually in the form of native token inside the blockchain itself. This transaction fee is paid by the initiator of the transaction.

Transaction fees play important roles in the blockchain system. These fees function to control access to the blockchain system, to control the use of resources within the system, and to provide an incentive to miners to process transactions initiated by a user.

1. Access Control

One of the main roles of a transaction fee is to prevent malicious users from launching dust attacks. If there is no fee, a user can initiate massive transactions to block the processing channels, making the blockchain system unable to handle normal transactions and causing denial of service, without paying anything. In the case of fees, if a malicious user wants to initiate massive transactions, it must pay a large amount of transaction fees, making such an attack very expensive. Accordingly, in most systems only transactions that pay transaction fees can be accepted by the blockchain system and processed. So the transaction fee provides the simplest access control to allow transactions into the blockchain system.

2. Resource Usage Control

Another role of the transaction fee is to limit the use of the services the blockchain system can provide, so as to make the network resources, e.g., processing power, network bandwidth, storage, available to all users. In Bitcoin, the upper limit of the size of each block determines the upper limit of the transaction volume that can be handled. In Ethereum, the current total amount of gas limits the transaction volume that can be processed. The configurable transaction fee can be used to determine the priority of each transaction to obtain system resources.

3. Compensation for Miners

The transaction fee provides an incentive to miners to process transactions initiated by a user. Each miner can choose the transactions to be included in a block. Therefore, the transaction fee is a guarantee for transaction processing.

Thus, transaction fees play important roles that preserve and enhance the operation of a blockchain system. Transaction fees, however, have the reverse import for blockchain-based applications, especially when the number of users holding system tokens is small at an early stage. The current blockchain application logic is typically based on transactions or smart contracts. Because a user must pay a certain transaction fee for requesting, invoking, or initiating a transaction on a contract in the blockchain, it is necessary for the user to obtain some tokens of the blockchain system in some way before using the blockchain application.

The process of obtaining a blockchain system token, however, is rather lengthy and complicated, and the learning curve for a user to know how to properly use the token is very steep. Because of this, the users of a blockchain are mostly limited to those users who already have tokens. This limitation can greatly reduce the number of users of a blockchain application and thus reduces widespread adaptation of the application. In addition, since the value of the token itself changes quickly, if the appreciation is huge, even a small amount of fees will become very expensive. This situation has had a serious impact on the existing Bitcoin network.

There are several existing solutions for this:

In some blockchain operating systems, if a user already has tokens, it can invoke certain fee-free transaction calls or transactions requests for a certain period of time proportional to the token amount. However, this feature does not solve the lack-of-access problem for potential users of blockchain applications that do not have any system tokens.

Another solution is to provide a certain amount of token for a user to use for free. The user can be automatically assigned a certain 'activation' token after normal registration with a blockchain application, so that the user can consume the free tokens to initiate or request a transaction or invoke or call a smart contract. However, there are several problems with this solution: First, the system needs an application-level interface to issue 'activation' tokens, which is a centralized solution. Second, the limited number of tokens available does not really provide a long-term solution. Furthermore, this approach will greatly reduce the effectiveness of the token-economy.

It is therefore desirable to provide for the initiation of transactions in a blockchain environment without requiring payment of a transaction fee. It is further desirable to provide these fee-less transactions in a way that preserves the operational integrity of the blockchain environment by controlling access to the environment itself and the allocation of resources within the environment. The concepts disclosed below address these needs and others.

SUMMARY

A mechanism for managing a decentralized application, e.g., a blockchain application, functioning within an application shard in a decentralized network includes an access control mechanism and a resource control mechanism. Each of the access control mechanism and the resource control mechanism may be implemented as a smart contract. The access control mechanism includes access logic that determines if a request to submit a transaction for execution by the decentralized application is valid. The request is received from an originator through the decentralized application. The resource control mechanism is subject to being called when a request is determined by the access control mechanism to be a valid request. The resource control mechanism includes resource logic that determines if a criterion is satisfied. The criterion may include one or more of a first criterion associated with the originator and a second criterion associated with the application shard. The resource control mechanism further includes forwarding logic that initiates a forwarding of the validated request to the application shard if the criterion is satisfied.

A method of managing a decentralized application, e.g., a blockchain application, functioning within an application shard in a decentralized network includes determining if a request to submit a transaction for execution by the decentralized application is valid. The request is received from an originator through the decentralized application. If the request is determined to be valid, the method proceeds with determining if a criterion is satisfied. The criterion may include one or more of a first criterion associated with the originator and a second criterion associated with the application shard. If the criterion is satisfied, the validated request is forwarded to the application shard.

A monitor node for facilitating management of a decentralized application, e.g., a blockchain application, functioning within an application shard in a decentralized network includes a network interface, a memory, and a processor coupled to the network interface and the memory. The processor is configured to receive a request to submit a transaction for execution by the decentralized application. The request is received from an originator through the decentralized application. The processor is further configured to determine if the request to submit a transaction for execution by the decentralized application is a valid request, and to initiate a forwarding of the request to a proxy node when the request is determined to be a valid request.

A method of facilitating management of a decentralized application, e.g., a blockchain application, functioning within an application shard in a decentralized network includes receiving a request to submit a transaction for execution by the decentralized application, wherein the request is received from an originator through the decentralized application. The method further includes determining if the request to submit a transaction for execution by the decentralized application is a valid request, and initiating a forwarding of the request to a proxy node when the request is determined to be a valid request.

A proxy node for facilitating management of a decentralized application, e.g., a blockchain application, functioning within an application shard in a decentralized network includes a network interface, a memory, and a processor coupled to the network interface and the memory. The processor is configured to receive a request to submit a transaction for execution by the decentralized application. The request is received from a monitor node. The processor is further configured to determine if a criterion is satisfied by applying resource logic to the request. The criterion includes one or more of a first criterion associated with an originator of the request and a second criterion associated with the application shard. The processor is further configured to initiate a forwarding of the request to the application shard if the criterion is satisfied.

A method of facilitating management of a decentralized application, e.g., a blockchain application, functioning within an application shard in a decentralized network includes receiving a request to submit a transaction for execution by the decentralized application. The request is received from a monitor node. The method further includes determining if a criterion is satisfied by applying resource logic to the request. The criterion includes one or more of a first criterion associated with an originator of the request and a second criterion associated with the application shard. The method further includes initiating a forwarding of the request to the application shard when the criterion is satisfied.

It is understood that other aspects of mechanisms, nodes, and methods will become readily apparent to those skilled in the art from the following detailed description, wherein various aspects are shown and described by way of illustration.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
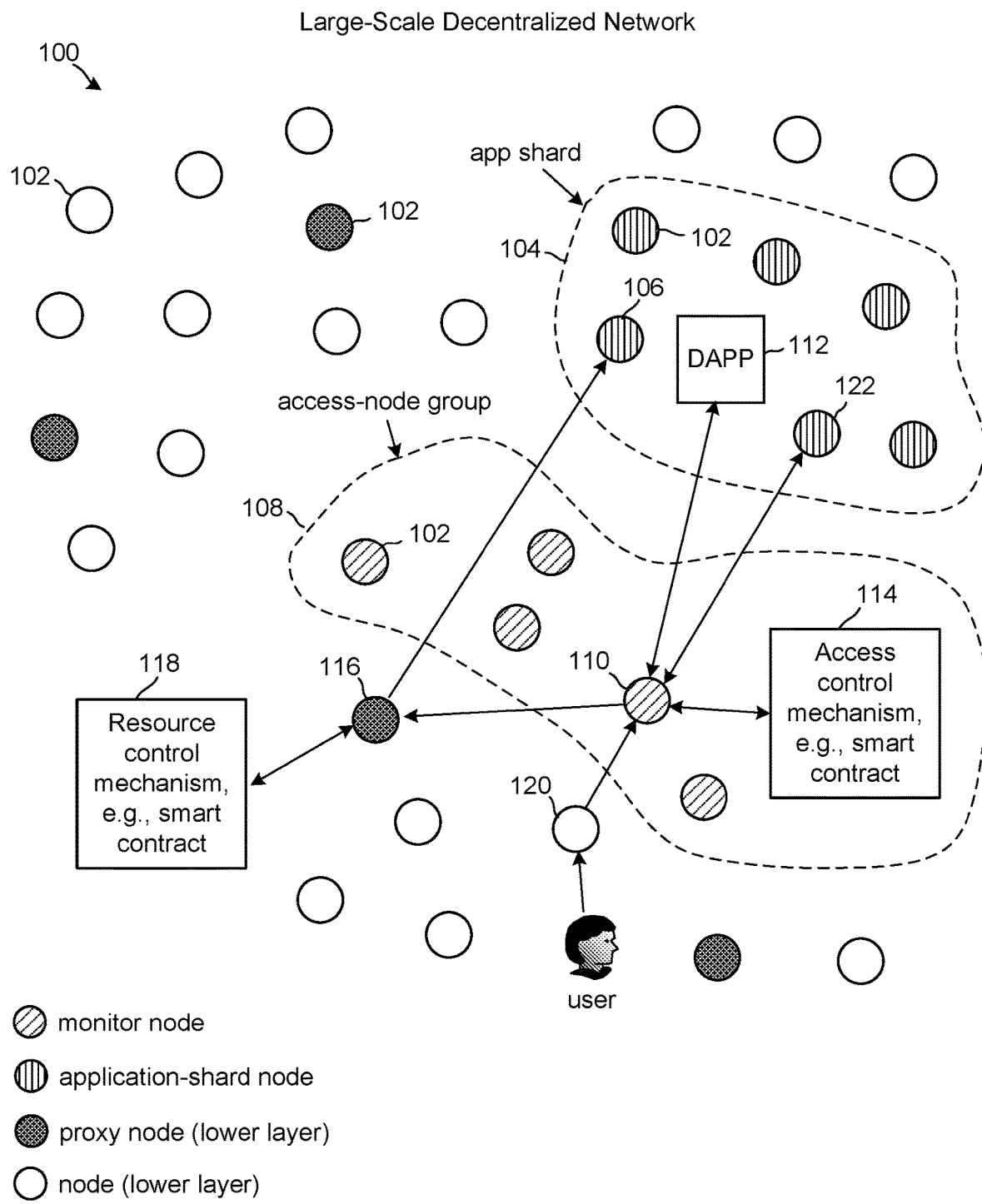
FIG. 1 is an illustration of a large-scale decentralized network, including groups of nodes forming an application shard and an access-node pool, and an access control mechanism and a resource control mechanism for managing blockchain transaction requests for a decentralized application functioning within an application shard in a decentralized network.

FIG. 1 is an illustration of a peer-to-peer network 100 having a large number of distributed nodes 102 forming a large-scale decentralized network or system. The number of nodes 102 in the large-scale decentralized network 100 may be, for example, around 10,000. Nodes 102 within the large-scale decentralized network 100 are grouped into an application shard 104 and a pool of access nodes 108, referred to as an access-node group. These groups of nodes 104, 108 may be described as upper layers of the large-scale decentralized network 100. Nodes outside of these groupings 104, 108 represent the lower layer of the large-scale decentralized network 100. While a large number of nodes 102 and shards 104 may be present in a large-scale decentralized network, for ease of illustration, a reduced number of nodes and shards are shown in FIG. 1.

The application shard 104 represents a logical grouping of nodes 102 within the large-scale decentralized network 100. The node groupings may be based on the needs of an application being run on the nodes in the application shard 104. For example, in FIG. 1, a decentralized application (DAPP) for executing blockchain transactions is deployed among a group of nodes in an application shard 104. To this end, the nodes 102 in the application shard 104 may be coordinated to perform certain tasks through, for example, a consensus protocol.

The access-node group 108 in the large-scale decentralized network 100 represents a pool of nodes 102, referred to as monitor nodes or simply monitors. A function of a monitor node 110 within the access-node group 108 is to control access to, and enable user interaction, with a DAPP 112 deployed in the application shard 104. For example, a user may submit a transaction request to the monitor node 110 through a user node 120, seeking to initiate a blockchain transaction through the DAPP 112, wherein the transaction is directed to an application-shard node 106 in the application shard 104. The monitor node 110 processes the request to determine if it is valid, and if it is valid, forwards the transaction to the lower layer of the large-scale decentralized network 100. The monitor nodes 110 forming the access-node group 108 may be allocated by the DAPP 112 owner. The monitor node 110 may synchronize with an application-shard node 122 to provide local access to the DAPP 112 at the monitor node. Alternatively, the monitor node 110 may serve as a feedthrough node providing the user node 120 access to the DAPP 112 within the application shard 104.

An access control mechanism 114 associated with the access-node group 108 may manage the access-node group, and the use of these monitor nodes 110 by other nodes outside the access-node group. In accordance with embodiment disclosed herein, the access control mechanism 114 manages the operation of the monitor node 110 as it relates to requests by users to execute transactions in the application shard 104 by providing access logic that defines conditions or criteria under which a user may be granted access to resources within the application shard. The access control mechanism 114 may be, for example, embodied as a smart contract deployed in the public blockchain system like Bitcoin and Ethereum.

In one configuration, the monitor nodes 110 in the access-node group 108 may be available for rent or lease by other nodes within the large-scale decentralized network 100 seeking to initiate a transaction. Monitor nodes 110 may be rented or leased in accordance with a certain protocol or rule. For example, as previously mentioned, in a blockchain environment, the pool of available monitor nodes 110 can be controlled by an access control mechanism 114, e.g., a smart contract. Other nodes 102 within the large-scale decentralized network 100 can be added to the pool of monitor nodes 110 in the access-node group 108 by initially posting a bond. Once in the pool, these monitor nodes 110 are available for rent or lease by users through other nodes 102 in the large-scale decentralized network 100. In exchange for their use, accounts associated with the monitor nodes 110 may be compensated, for example, through an account credit in term of tokens.

The lower layer of the large-scale decentralized network 100 includes a group of proxy nodes 116. A function of a proxy node 116 is to relay a transaction received from a monitor node 110 to an application-shard node 106 in the application shard 104. A resource control mechanism 118 associated with the lower layer of the large-scale decentralized network 100 manages operation of the proxy node 116 by providing resource logic that defines additional conditions or criteria under which a user may be granted access to resources within the application shard 104. The resource control mechanism 118 may be, for example, embodied as a smart contract deployed in the public blockchain system like Bitcoin and Ethereum.

The monitor node 110 (operating in conjunction with the access control mechanism 114), together with the proxy node 116 (operating in conjunction with the resource control mechanism 118), facilitate a transaction between a user and an application-shard node 106 in an application shard 104 through a decentralized application 112 in a way that provides numerous benefits. These benefits include improved control over user access to network resources, and improved control over the use of available resources, the combination of which allows for fee-less use of the network in a way that will not over burden the large-scale decentralized network 100. Network resources in this context may refer to, for example, processing power, network bandwidth, storage, etc.

Improved control over user access to network resources is provided by a monitor node 110, operating in conjunction with an access control mechanism 114, e.g., smart contract. The access control mechanism 114 includes access logic functions or operations that define certain conditions or criteria that must be satisfied by a user in order to proceed to the next stage of resource access. For example, the access control mechanism 114 may include a smart contract that implements access logic that only allows registered users who are logged into the DAPP to advance to the next stage of resource access. The access logic of the access control mechanism is flexible, and may be reconfigured as needed to modify user access conditions and criteria. For example, in addition to the previously mentioned condition that a user be registered and logged in, other logic functions may require that a user have been conditionally granted access based on time to the network. In any case, user access is not necessarily predicated on a fee payment or a static gas criteria as is used in conventional systems. Instead, the access logic identifies allowed users in accordance with one or more of the foregoing rules and the allowed users advance to the next stage of resource access.

Improved control over the use of available resources is provided by a proxy node 116, operating in conjunction with a resource control mechanism, e.g., smart contract. The resource control mechanism 118 includes resource logic functions and operations that define conditions and criteria that must be satisfied by the user or DAPP in order to access network resources. For example, the resource control mechanism may include a smart contract that implements resource logic that grants access to network resources based on the bandwidth requirements of the DAPP, or limits access to network resources based on a transaction rate. For example, a user or DAPP may be granted access to network resources provided the user or DAPP only executes a certain number of transactions per second. If the user or DAPP exceeds its transaction rate, the resource logic of the resource control mechanism 118 may revoke that user's access to the resources. The rationale behind resource logic operation of the resource control mechanism is to limit a user or DAPP to reasonable use of the network to avoid abuse of the network or attack. Thus, the resource control mechanism 118 functions to control access to network resources in a way that prevents any one user or DAPP or shard from overusing the network resources, and thereby enables a fair and even allocation of resources among all shards.

Third, the level of control over the access to and use of network resources afforded by the monitor node 110, operating in conjunction with the access control mechanism 114, together with the proxy node 116, operating in conjunction with the resource control mechanism 118, effectively eliminates the need for fee-based access to network resources.

Having thus described the high level operation of nodes and mechanisms for controlling access to network resources, a more details description follows.

Figure 2A:
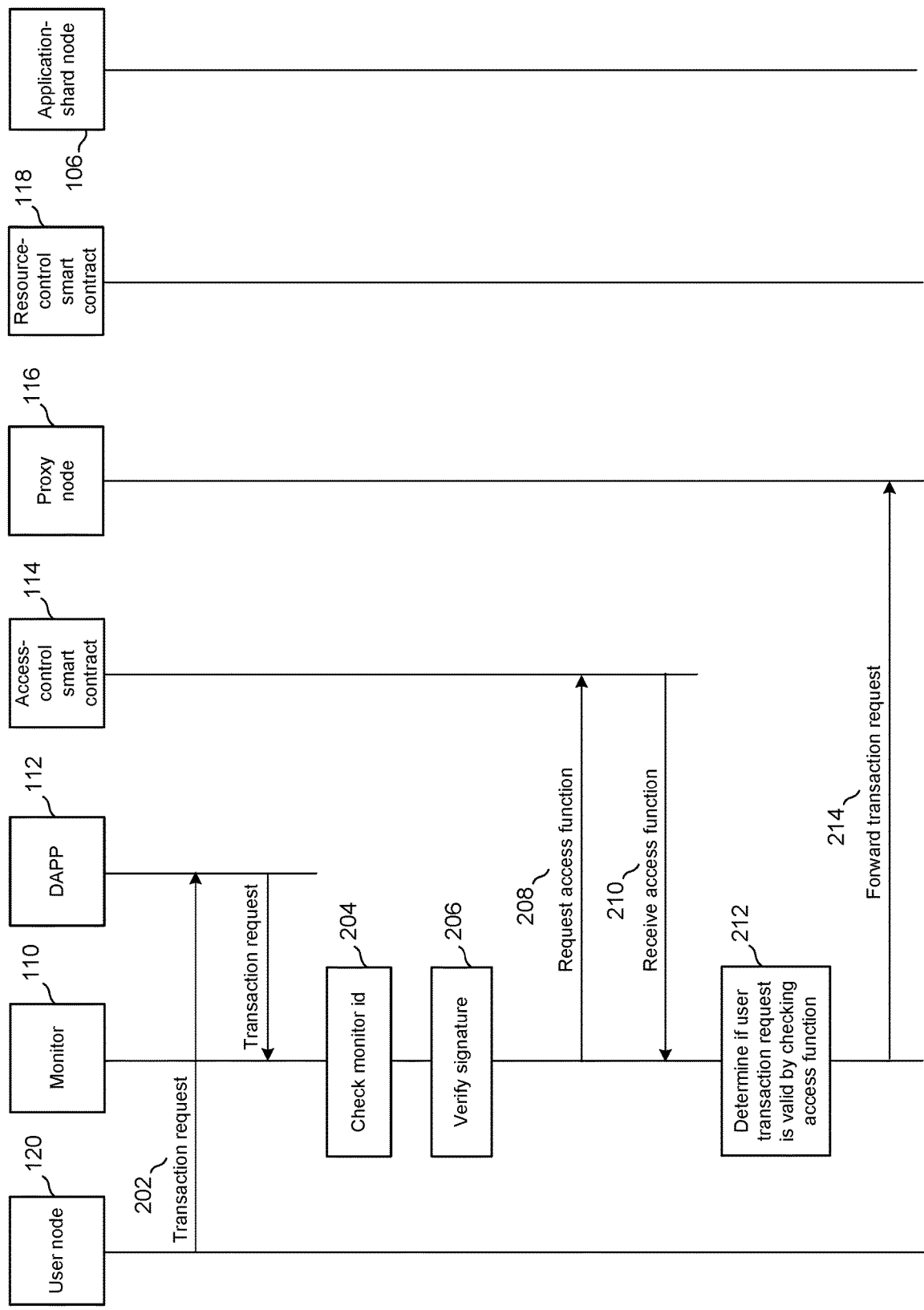
FIGS. 2A and 2B are flow diagrams of a process for managing access to the decentralized application functioning within the application shard of FIG. 1.
Figure 2B:
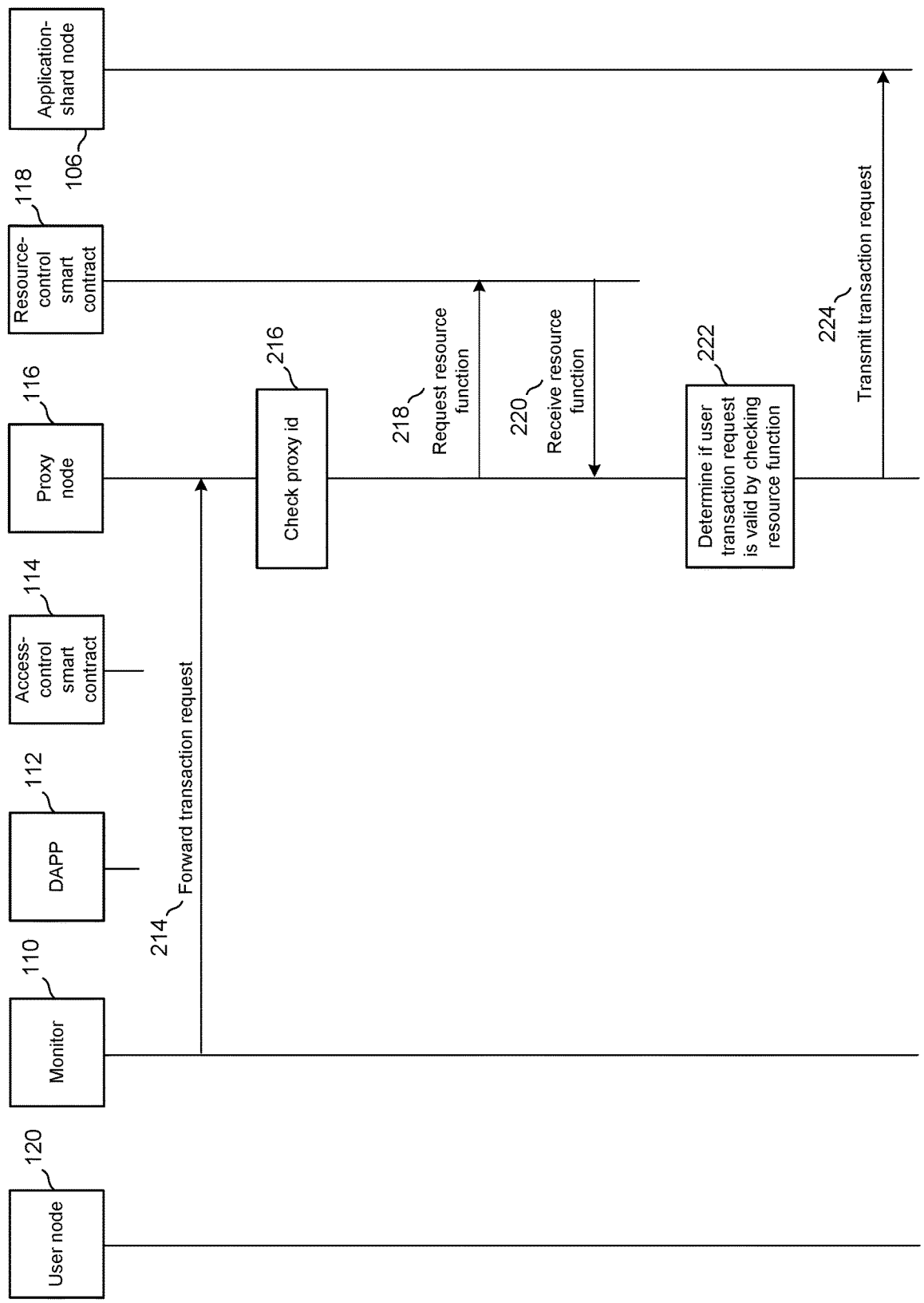

FIGS. 2A and 2B are flow diagrams of a process for managing access to a decentralized application (DAPP) 112 functioning within an application shard 104 in a decentralized network 100. The flow diagram of FIGS. 2A and 2B begins at a stage where a user desires to initiate a transaction with an application-shard node 106. The application-shard node 106 is associated with the application shard 104.

At operation 202, the user, through a user node 120, accesses the DAPP 112 through a monitor node 110 and generates a request using the DAPP. The request may be to execute a blockchain transaction via the DAPP. The monitor may be a user deployed node, or a node that is rented by the user from the access-node group 108 (such as monitor node 110 shown in FIG. 1), or may be a public monitor that is deployed by the developer of the application. In the case of the latter, the public monitor may be a node that is associated with the application shard 104. The transaction request includes a monitor id that corresponds to the monitor node 110, a proxy node id that corresponds to a proxy node 116, an address that corresponds to the address of the DAPP or more specifically the address of an application-shard node 106, and a signature that is signed by the user's private key.

At operation 204, the monitor node 110 verifies that the monitor id included in the transaction request matches the identification of the monitor. If the monitor id does not match the identification of the monitor, the process ends and the transaction request terminates. If the monitor id matches the identification of the monitor node 110, the monitor continues to process the transaction request by validating the request.

At operation 206, as part of an initial validation process, the monitor node 110 verifies the signature included in the transaction request using the user's public key. If the signature is not verified, the process ends and the transaction request terminates.

At operation 208, if the signature is verified, the monitor node 110 proceeds to a second stage of validation by accessing or calling the access control mechanism 114, e.g., smart contract, to request a static access function of the access control mechanism. The access control mechanism 114 is essentially a smart contract that comprises a collection of access functions. Each function defines some logic or rule. For example, a function, logic or rule may define is a user is allowed to use the DAPP. In a traditional scenario, the functions governing access are based on payment of a fee. For example, in a Bitcoin scenario, access logic checks if the user has paid a fee, while in a Ethereum scenario the access logic checks if the user has enough gas.

At operation 210, the monitor node 110 receives the access function or logic or rules from the access control mechanism. Going forward, the terms function, logic and rules are used interchangeably herein as equivalent terms.

At operation 212, the monitor node 110 processes the access function against information included in the request to complete the transaction validation process. Because the access function is static, the monitor node 110 may process the transaction request against the access function locally at the monitor node, as opposed to execution of function through consensus of multiple nodes.

In accordance with embodiments disclosed herein, a function of the access control mechanism is to validate requests, and thus possibly grant a user access to the application shard 104, under conditions that do not involve a fee or gas check. For example, an access function may compare a user identification included in the request against a log of registered users of the DAPP and only determine a request to be valid when the user identification is in the log. In another example, the access function checks if the user associated with the user identification is in a blacklist or not. In yet another example, the access functions checks if the user associated with the user identification has met the specific requirements of the DAPP, such as token holding, available storage, credit, roles in the application, etc.

At operation 214, if the request passes the second stage of the validation process, the monitor node 110 forwards the transaction request to a proxy node 116 at the lower layer of the network.

At operation 216, upon receipt of the request, the proxy node 116 verifies that the proxy id included in the transaction request matches the identification of the proxy node. If the proxy id does not match the identification of the proxy node 116, the process ends and the transaction request is terminated.

At operation 218, if the proxy id matches the identification of the proxy node, the proxy node 116 continues to process the transaction request by accessing or calling the resource control mechanism 118 to request a static resource function related to the resource availability at the application-shard node 106. The resource control mechanism 118 is essentially a smart contract that comprises a collection of resource functions. Each resource function defines some logic or rule. For example, a rule may set a limit on the total number of transaction an application shard 104 can handle in a given period of time. For example, a rule may allow one hundred calls to the application shard 104 per second for all users combined. If a user submitting a request happens to do so at a time where the capacity of the application shard 104 is met or exceeded, then the rule will not allow the request to proceed to the application shard.

In another example, a use limitation may be associated with the user submitting the request. For example, a user's right to resources of the application shard 104 may be limited to 10 times per second. If a user submitting a request does so at a time when the user limitation is met or exceeded, then the rule will not allow the request to proceed to the application shard 104.

At operation 220, the proxy node 116 receives the resource function from the resource control mechanism. Because the resource function is static, the proxy node 116 may process the transaction request against the resource function locally at the proxy node, as opposed to execution of function through consensus of multiple nodes.

At operation 222, the proxy node 116 processes the resource function to determine if the request should be permitted to proceed to the application shard 104, or more specifically, the application-shard node 106. In one implementation, the resource control mechanism 118 is configured to keep a resource counter for each shard in the network 100, including the application shard 104. The resource function received by the proxy node 116 may thus indicate to the proxy node 116 if the count for the application shard 104 has reached capacity. In another implementation, the resource function may determine that the user submitting the request has reached the user's use limitation. In either of these cases, the request will not be permitted to proceed. If the transaction to not permitted to proceed then the proxy node 116 will either suspend the transmitting of the request to the application-shard node 106 until the conditions denying permission have been removed, or terminate the transaction request altogether. In one configuration, if the request is delayed due to lack of resources at the application shard 104, the control mechanism 118 may acquire needed resources from another DAPP on behalf of the application shard. For example, the control mechanism 118 may purchase or rent additional resources from another DAPP.

At operation 224, if the proxy node 116 determines that the request is valid, the proxy node 116 transmits the transaction request to the application-shard node 106. The transmission may be in the form of a unicast transmission to a particular application-shard node 106 to a broadcast/multicast transmission to all of the application-shard nodes in the application shard 104.

Thus, the transaction request or call made by the user through the DAPP 112 is processed by a monitor node 110 (in conjunction with access functions provided by an access control mechanism 114) and a proxy node 116 (in conjunction with resource functions provided by a resource control mechanism 118) in a way that provides for controlled access and use of the resources within the network, e.g., the nodes in the application shard, to ensure fair access and use among all users and DAPPs, without the requirement of a transaction fee.

Figure 3:
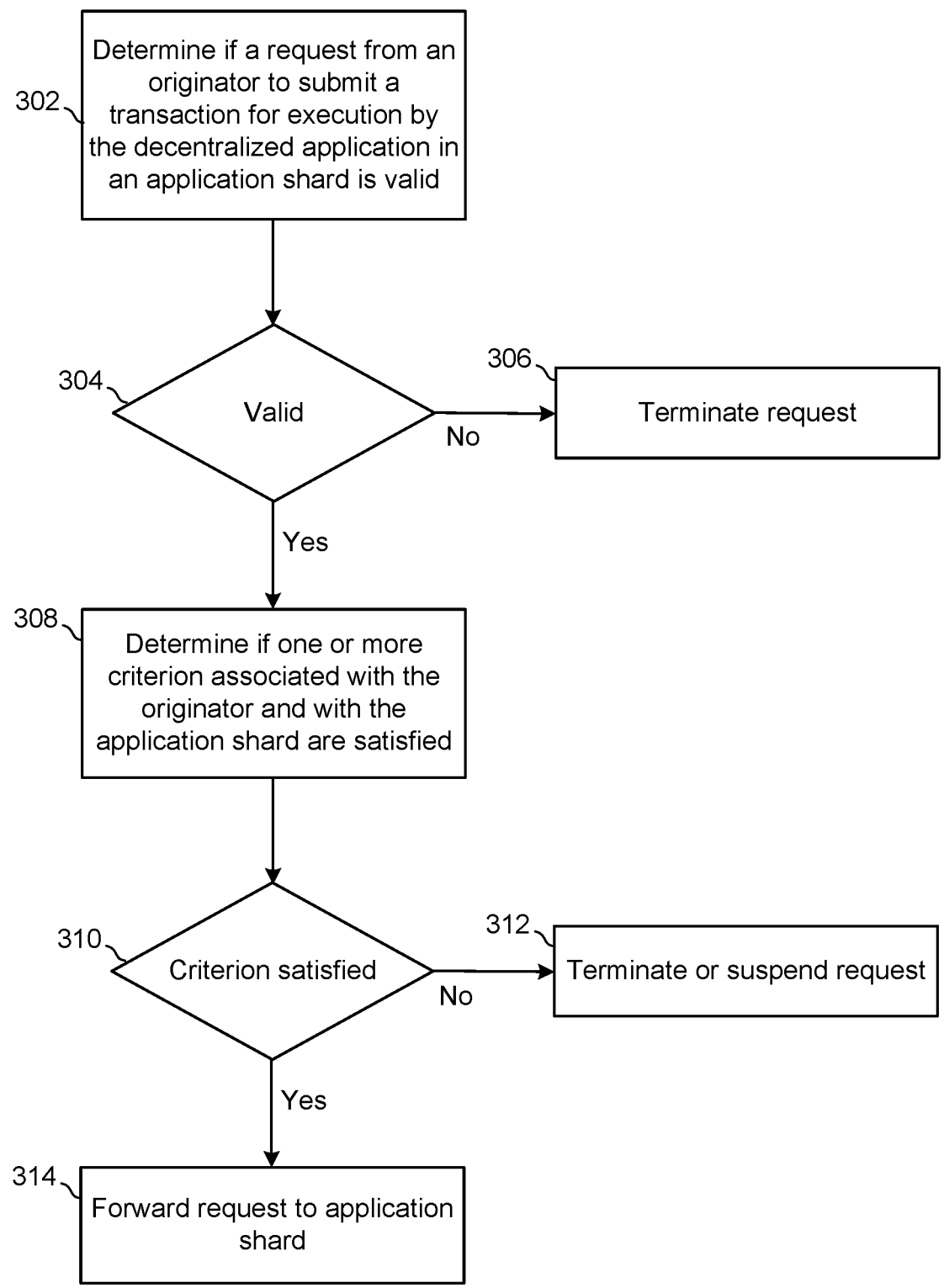
FIG. 3 is a flowchart of a method of the access control mechanism and a resource control mechanism of FIG. 1 for managing operation of the decentralized application functioning within the application shard of FIG. 1.

FIG. 3 is a flowchart of a method of managing operation of a decentralized application (DAPP) 112 functioning within an application shard 104 in a decentralized network 100. The method may be performed, for example, by the access control mechanism 114 and the resource control mechanism 118 of FIGS. 1, 2A, and 2B. The access control mechanism 114 may be resident in an access-control node within the access-node group 108, and may correspond to a smart contract that may be accessed or called by a monitor node 110. The resource control mechanism 118 may be resident in a resource-control node within the lower layer of the decentralized network 100 and may correspond to a smart contract that may be accessed or called by a proxy node 116.

At block 302, the access control mechanism 114 determines if a request to submit a transaction for execution by the decentralized application 112 is valid based on access logic included in the access control mechanism. The request is received from an originator, e.g., user, through a user node 120 that accesses the decentralized application 112. In one configuration, the access logic determines if a request is valid by verifying that the originator is a registered user of the decentralized application 112.

At block 304, if the request is determined by the access logic to be invalid, the process proceeds to block 306 where the request to submit a transaction to the application shard 104 is terminated.

Returning to block 304, if the request to submit a transaction to the application shard 104 is determined to be valid, the process proceeds to block 308, where the resource control mechanism 118 determines if a criterion is satisfied based on resource logic included in the resource control mechanism. The criterion may include one or more of a first criterion associated with the originator and a second criterion associated with the application shard 104.

At block 310, if the criterion is not satisfied, the process proceeds to block 312 where the request to submit a transaction to the application shard 104 is terminated or suspended. If suspended, the resource control mechanism 118 may periodically return to block 308 to redetermine if the criterion is satisfied or not satisfied. In this case, termination may occur after a period of time defined by the resource control mechanism 118 or after the process of block 308 has been repeated a number of time defined by the resource control mechanism.

Returning to block 310, if the criterion is satisfied, the process proceeds to block 314, where the resource control mechanism 118 initiates a forwarding of the validated request to the application shard 104. For example, the resource control mechanism 118 may cause a proxy node 116 to forward the request to the application shard 104, or more specifically an application-shard node 106 associated with the application shard.

Considering block 308 further, in one configuration, the first criterion associated with the originator may relate to a threshold number of transactions the originator may execute concurrently on the application shard 104 or the number of transactions an originator may execute within a given time period. This threshold number and transaction rate may be set by the decentralized application 112 based on the originator's history of use of the application. For example, a single DAPP can process up to 100 transaction per second (TPS), and one single originator can only submit 10 TPSs. The resource logic is configured to determine whether the threshold number or transaction rate has been met. If the number or rate has been met, meaning the originator has exceeded its allotted number of concurrent transactions or transaction rate, the criterion is not satisfied. If the number or rate has not been met, meaning the originator has not exceeded its allotted number of concurrent transactions or transaction rate, the criterion is satisfied.

In another configuration, the second criterion associated with the application shard 104 relates to a threshold number of transactions the application shard 104 can execute concurrently or the number of transactions the application shard may execute within a given time period, and the resource logic is configured to determine whether the threshold number has been met. This threshold number and transaction rate may be set by the resource control mechanism 118 based on the number of application-shard nodes associated with the application shard 104. The premise being that total resources, e.g., processing power, network bandwidth, storage, available in the application shard 104 is a function of the number of nodes. If the threshold number of transactions or the transaction rate has been met, meaning the application shard 104 has exceeded its allotted number of concurrent transactions or transaction rate, the criterion is not satisfied. If the threshold number of transactions or transaction rate has not been met, meaning the application shard 104 has not exceeded its allotted number of concurrent transaction or transaction rate, the criterion is satisfied.

Figure 4:
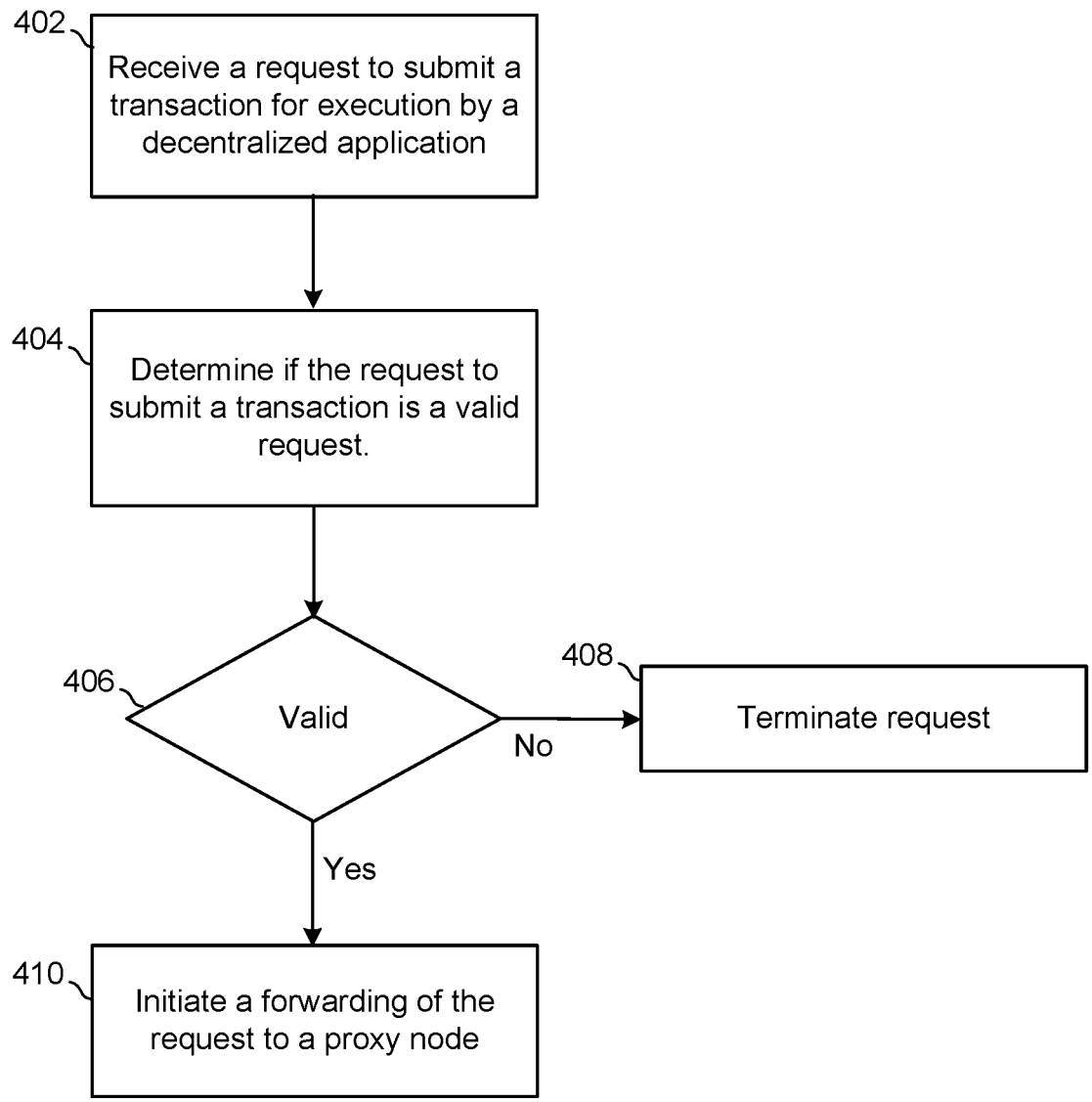
FIG. 4 is a flowchart of a method of a monitoring node operating in conjunction with the access control mechanism of FIG. 1 to facilitate management of the decentralized application.

FIG. 4 is a flowchart of method facilitating management of a decentralized application (DAPP) 112 functioning within an application shard 104 in a decentralized network 100. The method may be performed, for example, by a monitor node 110.

At block 402, the monitor node 110 receives a request to submit a transaction for execution by the decentralized application 112. The request is received from an originator through the decentralized application 112.

At block 404, the monitor node 110 determines if the request to submit a transaction for execution by the decentralized application is a valid request. As an initial part of the validation process the monitor node 110 determines if a monitor identification included in the request matches an identification of the monitor node. The monitor node 110 also verifies that a signature included in the request is the signature of the originator, for example, by confirming a signature using public/private key authentication.

At block 406, if the request is determined by the monitor node 110 to not be valid based on the initial part of the validation process, the process proceeds to block 408 where the request to submit a transaction to the application shard 104 is terminated.

Returning to block 404, if the request is determined by the monitor node 110 to be initially valid based on the initial validation process, the monitor node 110 initiates a second stage of the validation process. During this stage, the monitor node 110 determines if the request is a valid request by applying an access function to the request. The access function may be obtained by the monitor node 110 by calling an access control mechanism 114. In one configuration, the access logic determines if the request to submit a transaction to the application shard 104 is valid by verifying that the originator of the request is a registered user of the decentralized application 112.

At block 406, if the request is determined by the monitor node 110 during the second stage of the validation process to be invalid, the process proceeds to block 408 where the request to submit a transaction to the application shard 104 is terminated.

Returning to block 406, if the request is determined by the monitor node 110 during the second stage of the validation process to be invalid, the process proceeds to block 410, where the monitor node initiates a forwarding of the request to a proxy node 116.

Figure 5:
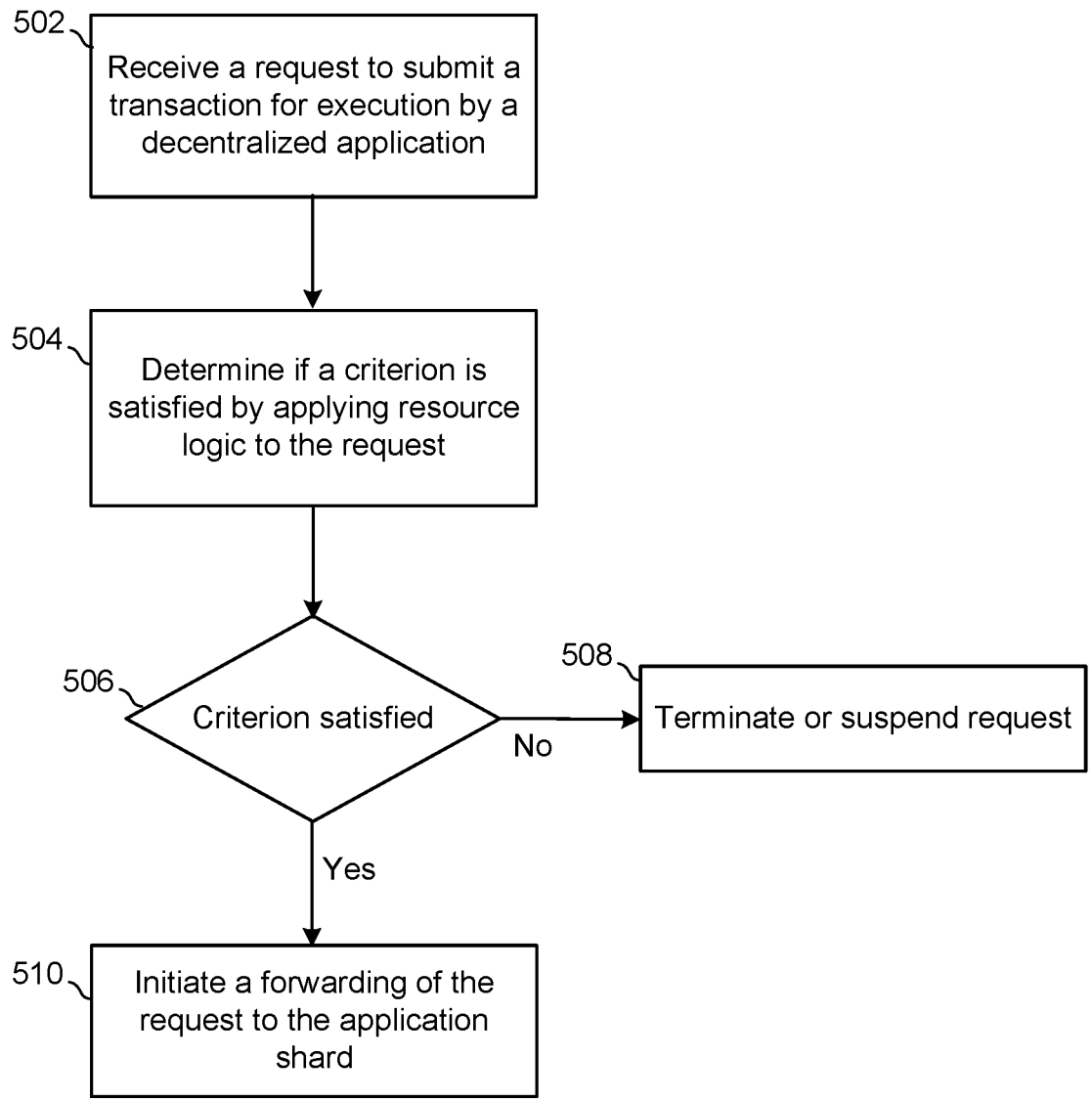
FIG. 5 is a flowchart of a method of a proxy node operating in conjunction with the resource control mechanism of FIG. 1 to facilitate management of the decentralized application.

FIG. 5 is a flowchart of method facilitating management of a decentralized application (DAPP) 112 functioning within an application shard 104 in a decentralized network 100. The method may be performed, for example, by a proxy node 116.

At block 502, the proxy node 116 receives a request to submit a transaction for execution by the decentralized application 112. The request may be received from a monitor node 110.

At block 504, the proxy node 116 determines if a criterion is satisfied by applying a resource function to the request. The resource logic may be obtained by the proxy node 116 by calling a resource control mechanism 118. In one configuration, a first criterion is associated with the originator and relates to a threshold number of concurrent transaction or a transaction rate for the originator. The resource logic is configured to determine whether the criterion is satisfied based on the threshold number or transaction rate of the originator, in the way described above with reference to FIG. 3.

In another configuration, a second criterion is associated with the application shard and relates to a threshold number of concurrent transactions or a transaction rate for the application shard. The resource logic is configured to determine whether the criterion is satisfied based on the threshold number or transaction rate of the application shard 104, in the way described above with reference to FIG. 3.

At block 506, if the criterion is not satisfied, the process proceeds to block 508 where the request to submit a transaction to the application shard 104 is terminated or suspended. If suspended, the resource control mechanism 118 may periodically return to block 504 to redetermine if the criterion is satisfied or not satisfied. In this case, termination may occur after a period of time defined by the resource control mechanism 118 or after the process of block 504 has been repeated a number of time defined by the resource control mechanism.

Returning to block 506, if the criterion is satisfied, the process proceeds to block 510, where the proxy node 116 initiates a forwarding of the request to the application shard 104, or more specifically, an application-shard node 106.

Figure 6:
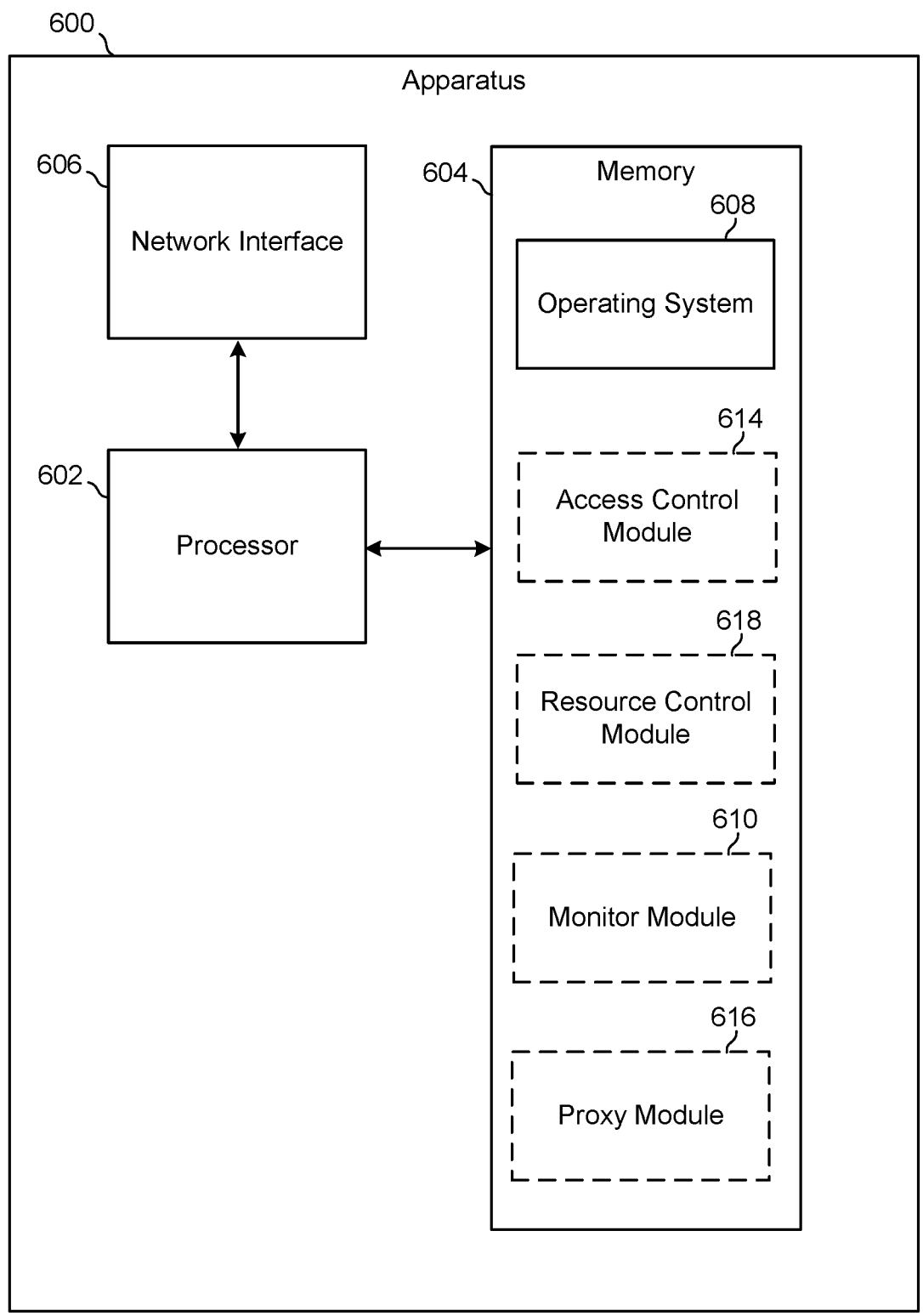
FIG. 6 is a block diagram of an apparatus corresponding to, in one embodiment, an access control mechanism or a resource control mechanism configured to implement the method of FIG. 3, in another embodiment, a monitor node configured to implement the method of FIG. 4, and in another embodiment, a proxy node configured to implement the method of FIG. 5.

FIG. 6 is a schematic block diagram of an apparatus 600. The apparatus 600 may correspond to one or more nodes having an access control mechanism 114 and a resource control mechanism 118 configured to enable the method of managing operation of a DAPP 112 functioning within an application shard 104 in a decentralized network 100, as described above with reference to FIG. 3. Alternatively, the apparatus 600 may correspond to a monitor node 110 configured to enable the method of facilitating management of a DAPP 112 functioning within an application shard 104 in a decentralized network 100, as described above with reference to FIG. 4. Or the apparatus 600 may correspond to a proxy node 116 configured to enable the method of facilitating management of a DAPP 112 functioning within an application shard 104 in a decentralized network 100, as described above with reference to FIG. 5.

The apparatus 600 may include one or more processors 602 configured to access and execute computer-executable instructions stored in at least one memory 604. The processor 602 may be implemented as appropriate in hardware, software, firmware, or combinations thereof. Software or firmware implementations of the processor 602 may include computer-executable or machine-executable instructions written in any suitable programming language to perform the various functions described herein. The processor 602 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 600 may also include a chipset (not shown) for controlling communications between the processor 602 and one or more of the other components of the apparatus 600. The processor 602 may also include one or more application-specific integrated circuits (ASICs) or application-specific standard products (ASSPs) for handling specific data processing functions or tasks.

The memory 604 may include, but is not limited to, random access memory (RAM), flash RAM, magnetic media storage, optical media storage, and so forth. The memory 604 may include volatile memory configured to store information when supplied with power and/or non-volatile memory configured to store information even when not supplied with power. The memory 604 may store various program modules, application programs, and so forth that may include computer-executable instructions that upon execution by the processor 602 may cause various operations to be performed. The memory 604 may further store a variety of data manipulated and/or generated during execution of computer-executable instructions by the processor 602.

The apparatus 600 may further include one or more network interfaces 606 that may facilitate communication between the apparatus 600 and one or more other nodes using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 604 may store various program modules, application programs, and so forth that may include computer-executable instructions that upon execution by the processor 602 may cause various operations to be performed. For example, the memory 604 may include an operating system module (O/S) 608 that may be configured to manage hardware resources such as the network interface 606 and provide various services to applications executing on the apparatus 600.

If the apparatus 600 corresponds to one or more nodes having an access control mechanism 114 or a resource control mechanism 118, the memory 604 stores additional program modules such as an access control module 614 or a resource control module 618, each of which includes functions in the form of logic and rules that support and enable the method of managing operation of a DAPP 112 functioning within an application shard 104 in a decentralized network 100, as described above with reference to FIG. 3. Each of the access control module 614 or a resource control module 618 includes computer-executable instructions that when executed by the processor 602 cause various operations to be performed, such as the operations described above with respect to FIGS. 2A, 2B and 3. The access functions or resource functions of these respective modules 614, 618 may be also be called from their respective nodes and executed by a different node. To this end, access functions may be transmitted over the network interface 606 to a monitor node 110, while resource functions may be transmitted over the network interface 606 to a proxy node 116.

If the apparatus 600 corresponds to a monitor node 110, the memory 604 stores a monitor module 610 that supports and enables the method of facilitating management of a DAPP 112 functioning within an application shard 104 in a decentralized network 100, as described above with reference to FIG. 4. The monitor module 610 includes computer-executable instructions that when executed by the processor 602 cause various operations to be performed, such as the operations described above with respect to FIGS. 2A, 2B and 4.

If the apparatus 600 corresponds to a proxy node 116, the memory 604 stores a proxy module 616 that supports and enables the method of facilitating management of a DAPP 112 functioning within an application shard 104 in a decentralized network 100, as described above with reference to FIG. 5. The proxy module 616 includes computer-executable instructions that when executed by the processor 602 cause various operations to be performed, such as the operations described above with respect to FIGS. 2A, 2B and 5.

The apparatus 600 and modules 610, 614, 616, 618 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A mechanism for managing a decentralized application functioning within an application shard in a decentralized network, the mechanism comprising:
   an access control mechanism including access logic that determines if a request to submit a transaction for execution by the decentralized application is valid, wherein the request is received from an originator through the decentralized application; and
   a resource control mechanism subject to being called when a request is determined by the access control mechanism to be a valid request, the resource control mechanism including:
   resource logic that determines if a criterion is satisfied, the criterion including one or more of a first criterion associated with the originator and a second criterion associated with the application shard, and
   forwarding logic that initiates a forwarding of the validated request to the application shard if the criterion is satisfied, wherein the access control mechanism is resident in an access-control node comprising:
   a network interface;
   a memory; and
   a processor coupled to the network interface and the memory and configured to:
   provide the access logic to a monitor node over the network interface, wherein the monitor node enables an user interaction with the decentralized application, wherein the monitor node synchronizes with an application-shard node to provide a local access to the decentralized application at the monitor node, wherein the monitor node serves as a feedthrough node by providing an access of a user node to the decentralized application; and
   execute the access logic locally within the access-control node, wherein the monitor node forms an access-node group allocated by a decentralized application owner, wherein the monitor node in the access-node group is available for a lease by other nodes within a large-scale decentralized network seeking to initiate a transaction, wherein the other nodes within the large-scale decentralized network are added to a pool of monitor node in the access-node group by initially posting a bond, wherein the monitor node is associated with a plurality of accounts that are compensated in exchange for the lease through an account credit, wherein the access control mechanism is embodied as a smart contract deployed in a public blockchain system.

2. The mechanism of claim 1, wherein the access logic is configured to determine if a request is valid by verifying that the originator is an allowed user of the decentralized application.

3. The mechanism of claim 1, wherein a first criterion associated with the originator relates to a threshold number of transactions the originator may execute concurrently on the application shard, and the resource logic is configured to determine whether the threshold number has been met.

4. The mechanism of claim 1, wherein a second criterion associated with the application shard relates to a threshold number of transactions the application shard can execute concurrently and the resource logic is configured to determine resource logic is configured to determine whether the threshold number has been met.

5. The mechanism of claim 1, wherein the access-control node is resident in an upper layer of the decentralized network.

6. The mechanism of claim 1, wherein the resource control mechanism is resident is a resource-control node comprising:
   a network interface;
   a memory; and
   a processor coupled to the network interface and the memory and configured to one or more of:
      provide the resource logic and forwarding logic to a proxy node over the network interface; and
      execute the resource logic and forwarding logic locally within the resource-control node.

7. The mechanism of claim 6, wherein the resource-control node is resident in a lower layer of the decentralized network.

8. A monitor node for facilitating management of a decentralized application functioning within an application shard in a decentralized network, the monitor node comprising:
   a network interface;
   a memory; and
   a processor coupled to the network interface and the memory and configured to:
      receive a request to submit a transaction for execution by the decentralized application, wherein the request is received from an originator through the decentralized application;
      determine if the request to submit a transaction for execution by the decentralized application is a valid request;
      initiate a forwarding of the request to a proxy node when the request is determined to be a valid request;
      obtain the access logic by calling an access control mechanism that includes the access logic;
      enable a user interaction with the decentralized application;
      synchronize with an application-shard node to provide a local access to the decentralized application; and
      serve as a feedthrough node by providing an access of a user node to the decentralized application, wherein the monitor node forms an access-node group allocated by a decentralized application owner, wherein the monitor node in the access-node group is available for a lease by other nodes within a large-scale decentralized network seeking to initiate a transaction, wherein the other nodes within the large-scale decentralized network are added to a pool of monitor node in the access-node group by initially posting a bond, wherein the monitor node is associated with a plurality of accounts that are compensated in exchange for the lease through an account credit, wherein the access control mechanism is embodied as a smart contract deployed in a public blockchain system.

9. The monitor node of claim 8, wherein the processor is configured to determine if the request is a valid request by one or more of:
   determining if a monitor identification included m the request matches an identification of the monitor node; and
   verifying that a signature included in the request is the signature of the originator.

10. The monitor node of claim 8, wherein the processor is configured to determine if the request is a valid request by applying access logic to the request.

11. The monitor node of claim 10, wherein the access logic is configured to determine if a request is valid by verifying that the originator of the request is an allowed user of the decentralized application.

12. A proxy node for facilitating management of a decentralized application functioning within an application shard in a decentralized network, the proxy node comprising:
   a network interface;
   a memory; and
   a processor coupled to the network interface and the memory and configured to:
      receive a request to submit a transaction for execution by the decentralized application, wherein the request is received from a monitor node;
      determine if a criterion is satisfied by applying resource logic to the request, the criterion including one or more of a first criterion associated with an originator of the request and a second criterion associated with the application shard; and
      initiate a forwarding of the request to the application shard when the criterion is satisfied, wherein the monitor node enables an user interaction with the decentralized application, wherein the monitor node synchronizes with an application-shard node to provide a local access to the decentralized application at the monitor node, wherein the monitor node serves as a feedthrough node by providing an access of a user node to the decentralized application, wherein the monitor node forms an access-node group allocated by a decentralized application owner, wherein the monitor node in the access-node group is available for a lease by other nodes within a large-scale decentralized network seeking to initiate a transaction, wherein the other nodes within the large-scale decentralized network are added to a pool of monitor node in the access-node group by initially posting a bond, wherein the monitor node is associated with a plurality of accounts that are compensated in exchange for the lease through an account credit, wherein the resource logic is embodied as a smart contract deployed in a public blockchain system.

13. The proxy node of claim 12, wherein a first criterion associated with the originator relates to a threshold number of transactions the originator may execute concurrently on the application shard, and the resource logic is configured to determine whether the threshold number has been met.

14. The proxy node of claim 12, wherein a second criterion associated with the application shard relates to a threshold number of transactions the application shard can execute concurrently and the resource logic is configured to determine resource logic is configured to determine whether the threshold number has been met.

15. The proxy node of claim 12, wherein the processor is further configured to obtain the resource logic by calling a resource control mechanism that includes the resource logic.

\* \* \* \* \*